United States Patent [19]
Wall et al.

[11] Patent Number: 5,354,100
[45] Date of Patent: Oct. 11, 1994

[54] WELDABLE PIPE FITTINGS AND PIPE JOINTS FORMED THEREWITH

[75] Inventors: David J. Wall, Caldecott; Robert E. Beechey, Oakham, both of England

[73] Assignees: Victaulic PLC; Rutland Plastics Limited, Leicestershire, United Kingdom

[21] Appl. No.: 854,289

[22] Filed: Mar. 20, 1992

[30] Foreign Application Priority Data

Mar. 20, 1991 [GB] United Kingdom ............... 9105937

[51] Int. Cl.⁵ .................... H05B 3/58; F16L 47/02
[52] U.S. Cl. .................... 285/21; 285/292; 285/786; 219/544
[58] Field of Search ............. 285/21, 284, 292, 22, 285/286; 219/535, 534, 544

[56] References Cited

U.S. PATENT DOCUMENTS

| | | | |
|---|---|---|---|
| 3,422,179 | 1/1969 | Bauer et al. | 285/21 |
| 3,943,334 | 3/1976 | Sturm | 219/544 |
| 4,618,168 | 10/1986 | Thalmann et al. | 285/21 |
| 4,622,087 | 11/1986 | Ansell | 285/21 |
| 4,778,981 | 10/1988 | Rüede | 219/535 |
| 4,825,534 | 5/1989 | White et al. | 285/21 |
| 4,842,305 | 6/1989 | Kistenich et al. | 285/21 |
| 5,150,922 | 9/1992 | Nakashiba et al. | 285/21 |
| 5,163,713 | 11/1992 | Brettell et al. | 285/21 |

FOREIGN PATENT DOCUMENTS

| | | | |
|---|---|---|---|
| 26398 | 1/1990 | Japan | 285/21 |
| 2253093 | 10/1990 | Japan | 285/21 |
| 2253094 | 10/1990 | Japan | 285/21 |

*Primary Examiner*—Eric K. Nicholson
*Attorney, Agent, or Firm*—Kinney & Lange

[57] ABSTRACT

A weldable pipe fitting includes a sleeve member of thermoplastic material, the sleeve member having a stress resistant portion of greater wall thickness, a terminal portion of greater wall thickness, and a fusion accommodating portion of lesser wall thickness between the stress resistant portion and the terminal portion, wherein the stress resistant portion is arranged in use to overlie the end of the pipe to be connected to the pipe fitting; the stress resistant portion of the sleeve has a standard dimensional ratio within the range of no less than 8:1 and no more than 12:1, the terminal portion of the sleeve has a standard dimensional ratio within the range of of no less than 8:1 and no more than 12:1, and the fusion accommodating portion has a standard dimensional ratio within the range of no less than 14:1 and no more than 19:1; and the internal wall of the sleeve is provided with an electric heating wire or wires along and within the wall and disposed circumferentially thereof adjacent the radially inner surface of the wall, said heating wire or wires being disposed over a length of the sleeve at least the majority of which is within the fusion accommodating portion thereof.

10 Claims, 1 Drawing Sheet

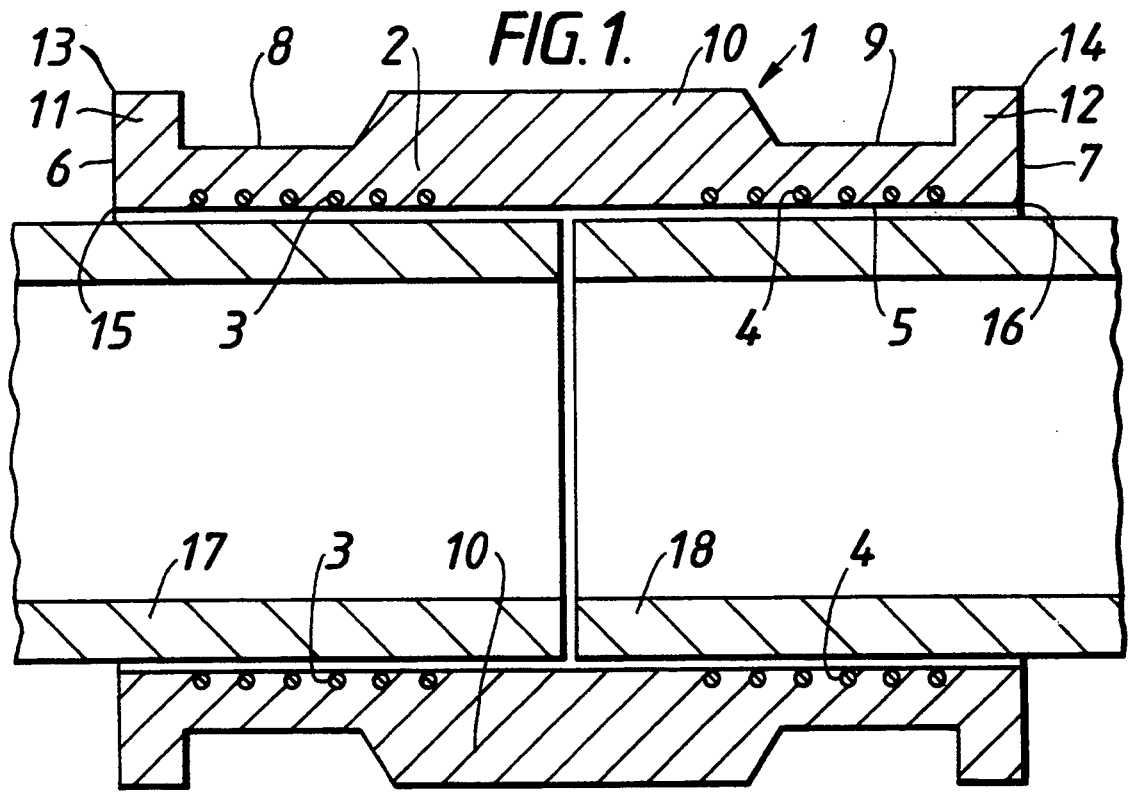
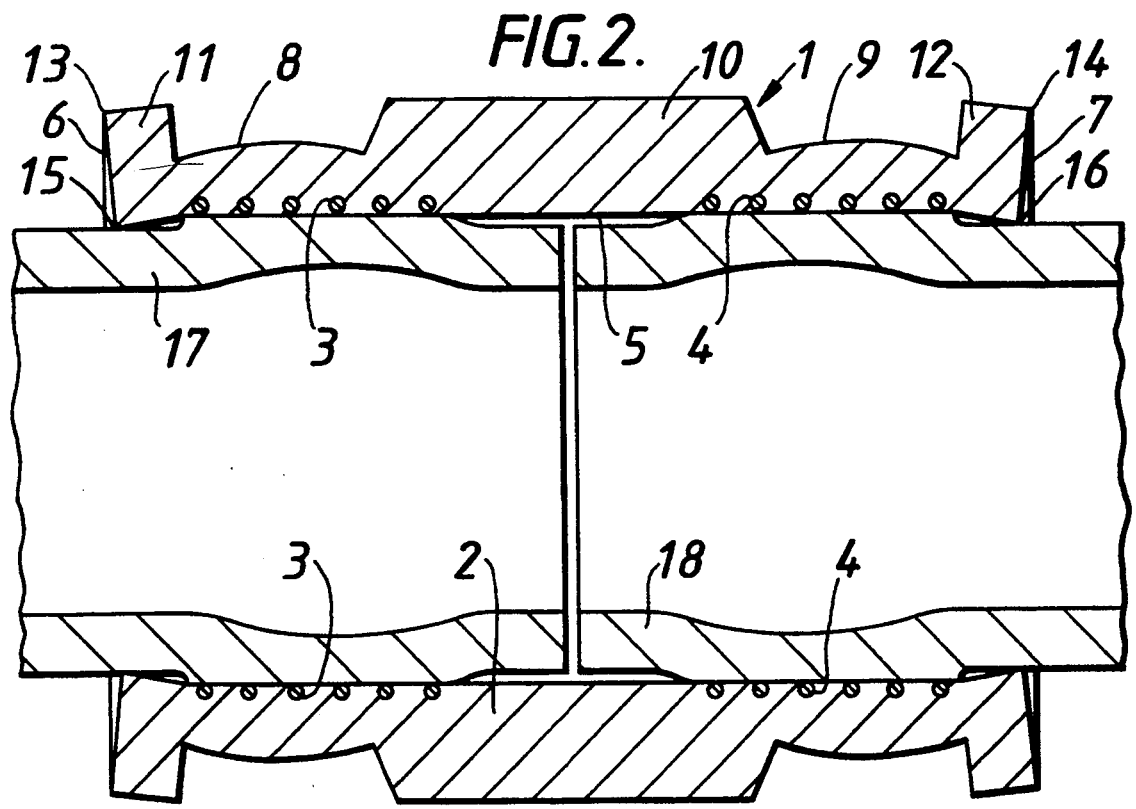

WELDABLE PIPE FITTINGS AND PIPE JOINTS FORMED THEREWITH

BACKGROUND OF THE INVENTION

This invention relates to weldable pipe fittings, by which is meant hollow thermoplastic fittings connectable to thermoplastic pipes in which a part of an inner peripheral wall of the fitting is arranged to be joined by fusion or "welding" to a part of an outside peripheral wall of a plastics pipe. The invention relates more particularly to the production of such weldable fittings adapted to be fused to the outside periphery of a pipe by means of an electric heating wire embedded within the fitting.

It is to be understood that the expression "pipe" as used herein includes pipes and tubes as such and also pipe-like members and fittings for use in pipework such as bends, elbows, "T" connectors, flange adaptors and parts and devices adapted to be fitted by pipe-like parts to the pipework such as valves and pumps.

It has already been proposed to provide a hollow plastics fitting of the kind referred to in which a helical groove is formed around a part of the inner wall of a sleeve-like part of a fitting within which is located an electrically conducting wire, so that when in use the fitting is placed in close proximity about a thermoplastic pipe or pipe-like member and an electric current passed through the electic wiring, melting of the adjacent plastics surfaces of the fitting and the pipe occurs and fusion or "welding" between the two bodies takes place.

Such arrangements are disclosed in our United Kingdom Patents 2135746B and 2135747B.

One of the critical factors in design of such fittings is ensuring the provision of consistently successful welds meeting professionally specified performance requirements. A most important aspect in this is achieving the correct conditions at the welding interface between the fitting and the pipe. Two such conditions comprise obtaining a suitable heating profile for satisfactory welding, and, perhaps more difficult to achieve, correct pressure within the molten plastics material during the welding process.

With the development of large diameter fittings for large diameter pipes, of 180 mm above, for example, the performance pressure requirements necessitate the use of thicker walled fittings and from this the achievement of the correct amount of heat and pressure during welding presents increasingly difficult problems with increase in size.

Thus, for example, the thickened walls of such large fittings can cause excessive melt pressure during the welding process resulting in molten polymer, and sometimes part of the heating wires, being extruded from between the pipe and the pipe fitting. Such movement of heating wires can cause, in extreme cases, overheating by contacting and short circuiting with each other, whilst at the other extreme, premature joint failure can be caused due to the chilling effect the large cold pipe has on the melt, resulting in crack propagation and joint failure.

Although theoretically a reduction in pressure at the weld melt could be achieved by reducing the wall thickness of the fitting, this can seriously compromise the stress performance under pressure in use of the fitting, whilst, in some situations still leading to exudation of molten polymer, and even at times voids along the weld interface due to the melt pressure producing a radially outward bending along the length of the reduced thickness and weakened fitting.

It is an object of the present invention to overcome or at least substantially reduce the above mentioned difficulties and problems.

SUMMARY OF THE INVENTION

In accordance with the present invention there is provided a weldable pipe fitting including a sleeve member of thermoplastic material, the sleeve member having a stress resistant portion of greater wall thickness, a terminal portion of greater wall thickness, and a fusion accommodating portion of lesser wall thickness between the stress resistant portion and the terminal portion, wherein the stress resistant portion is arranged in use to overlie an end of a pipe to be connected to the pipe fitting; the stress resistant portion of the sleeve has a standard dimensional ratio within the range of no less than 8:1 and no more than 12:1, the terminal portion of the sleeve has a standard dimensional ratio within the range of no less than 8:1 and no more than 12:1, and the fusion accommodating portion has a standard dimensional ratio within the range of no less than 14:1 and no more than 19:1; and the internal wall of the sleeve is provided with an electric heating wire or wires along and within the wall and disposed circumferentially thereof adjacent the radially inner surface of the wall, said heating wire or wires being disposed over a length of the sleeve at least the majority of which is within the fusion accommodating portion thereof.

The standard dimensional ratio is the ratio of the outside diameter to the wall thickness of the fitting sleeve member.

Preferably, the fusion accommodating portion of the sleeve has a standard dimensional ratio in the range of no less than 15:1 and no more than 17:1. Again, the terminal portion of the sleeve preferably has standard dimensional ratio in the range of no less than 9:1 and no more than 11:1. Yet again, preferably, the stress resistant portion of the fitting preferably has a standard dimensional ratio in the range of no less than 9:1 and no more than 11:1.

In one embodiment of the invention the heating wire or wires extend axially of the sleeve such that a minority thereof lie within the stress resistant portion of the sleeve, and this portion in its axial dimension may incorporate up to 40% of the heating wire or wires.

In another embodiment of the invention, the fitting sleeve is double-ended, and is, therefore, provided with two terminal portions two fusion accommodating portions, and two sets of electric heating wire or wires associated therewith, a single generally axially central stress resistant portion arranged in use to overlie two pipes to be connected to the fitting. The sets of heating wire or wires may be seperate from each other or may be connected in series, for example by helical wire continuations running, at wide pitch, around the inner perifery of the sleeve across the stress resistant portion.

The stress resistant portion of the sleeve may reduce by a conical incline to the or each fusion accommodating portion so that the change in stress performance axially along the fitting is not abruptly changed.

The invention includes within its scope a pipe joint incorporating a fitting as hereinabove defined.

BRIEF DESCRIPTION OF THE DRAWINGS

In order that the invention may be more readily understood, one embodiment thereof will now be described by way example with reference to the accompanying drawings in which:

FIG. 1 illustrates a fitting in accordance with the invention loosely placed about two pipes to be connected thereby, prior to electrofusion welding; and FIG. 2 shows the pipes and fitting of FIG. 1 during welding.

DETAILED DESCRIPTION OF THE PREFERRED EMBODIMENTS

As can be seen in FIG. 1, the pipe coupling 1 comprises a sleeve member 2 having helically wound heating elements or wires 3,4 at each end embedded just below the internal surface 5 of the sleeve, the helical heating elements being set in from the axial end walls 6,7 of the sleeves and ending, axially inwardly of the sleeves well short of the centre of the sleeve 2.

The sleeve is provided around its outer periphery with two substantial fusion accommodating portions 8,9 of reduced diameter radially overlying the majority of the heating elements 3,4 at each end of the sleeve 2, and thereby defining a central thicker stress resistant portion 10 overlying the ends of the two pipes 17,18 to be joined and two thicker terminal portions 11,12.

The standard dimensional ratio of the stress resistant portion 10 is typically 10:1, that of the fusion accommodating portions 8,9 is typically 18:1, and that of the terminal portions 11,12 is 11:1.

As can be seen from FIG. 2, during the passage of electric current through the heating elements 3,4 at each end of the sleeve during the welding cycle for welding the pipes 17,18 to the sleeve 2, the heating and consequent pressure adjacent the heating elements 3,4 causes the fusion accommodating portions 8,9 (and the pipes 17,18 thereadjacent) to bulge radially outwardly thereby reducing excessive pressure along the line of weld between the pipes and the sleeve. Additionally, this bulging expansion reacts in a lever-like manner on terminal portions 11,12, causing them to diverge at the radially outer extremities 13,14 of the sleeve end walls 6,7 from each other so that their radially inner edges 15,16 move inwardly reducing the clearance between the pipe and the radially inner extremities of the sleeve, thus reducing risk of exudation of melt therefrom. During this time the central stress resistant portion 10 of the fitting extending over the ends of the two pipes being connected is not significantly affected by the heating and bulging of the fusion accommodating portions 8,9 on either side.

After completion of the welding process, and upon cooling of the now welded pipes and sleeve, the bulged fusion accommodating portions 8,9 contract once more, causing the terminal portions 11,12 of the sleeve 2 to regain their original alignment.

It has been found that by means of the arrangement illustrated, satisfactory welds can be produced in which, because excessive melt pressure is limited by the radial movement of the fitting sleeve, axial movement of molten polymer and exudation thereof is severely limited reducing to a very large extent the risk of unsatisfactory welding.

The invention as illustrated thereby provides a significantly improved electrofusion welding fitting for large diameter pipes.

In a typical fitting of the kind illustrated in FIGS. 1 and 2 for use on 250 mm outside diameter pipe, the sleeve is formed of medium density polyethylene and has an overall axial length of 240 mm of which 25 mm comprises at each end the terminal portions of the fitting, 84 mm comprising the central stress resistant portion, tapering at each side at an angle of 30° for approximately 20 mm to reduced diameter fusion accommodating portions approximately 32 mm long. The central stress resistant portion and the tapered sides thereof extend over some 40% of the heating elements at each end, the remainder of which are disposed beneath the fusion accommodating portions. A taper may additionally be provided between the fusion accommodating portions and the terminal portions of the fitting. The wall thickness of the fitting at the terminal portions and at the central stress resistant portion is 30 mm and at the fusion accommodating portion approximately 17 mm.

It is to be understood that the foregoing is merely exemplary of pipe fittings and joints formed therewith in accordance with the invention and that modifications can readily be made thereto without departing from the true scope of the present invention.

What is claimed is:

1. A weldable pipe fitting including a sleeve member of thermoplastic material, the sleeve member having a stress resistant portion of greater wall thickness, a terminal portions of greater well thickness, and a fusion accommodating portion of lesser wall thickness between the stress resistant portions and the terminal portion, wherein the stress resistant portion inclines to the fusion accommodating portion by means of a tapered portion, and wherein the stress resistant portion is arranged in use to overlie an end of a pipe to be connected to the pipe fitting; the stress resistant portion of the sleeve has a standard dimensional ratio within the range of 8:1 to 12:1 inclusive, the terminal portion of the sleeve has a standard dimensional ratio within the range of 8:1 to 12:1 inclusive, and the fusion accommodating portion has a standard dimensional ratio within the range of 14:1 to 19:1 inclusive; and the internal wall of the sleeve is provided with an electric heating wire or wires along and within the wall and disposed circumferentially thereof adjacent the radially inner surface of the wall, said heating wire or wires being disposed over a length of the sleeve at least the majority of which is within the fusion accommodating portion thereof.

2. A weldable pipe fitting as claimed in claim 1 wherein the fusion accommodating portion of the sleeve has a standard dimensional ratio in the range of 15:1 to 17:1 inclusive.

3. A weldable pipe fitting as claimed in claim 1 wherein the terminal portion of the, sleeve has a standard dimensional ratio in tile range of 9:1 to 11:1 inclusive.

4. A weldable pipe fitting as claimed claim 1 wherein the stress resistant portion of the fitting has a standard dimensional ratio in the range of 9:1 to 11:1 inclusive.

5. A weldable pipe fitting as claimed in claim 1 wherein the heating wire or wires extend axially of the sleeve such that a minority thereof lie within the stress resistant portion of the sleeve.

6. A weldable pipe fitting as claimed in claim 5 wherein said minority of the heating wire or wires within the stress resistant portion of the sleeve incorporates up to 40% of the heating wire or wires.

7. A weldable pipe fitting as claimed in claim 1 wherein the stress resistant portion of the sleeve reduces by a conical incline to the fusion accommodating portion.

8. A weldable pipe fitting as claimed in claim 1 which is double ended and provided with two terminal portions, two fusion accommodating portions and two sets of electric heating wire or wires associated therewith, and a single generally axially central stress resistant portion arranged in use to override two pipes to be connected to the fitting.

9. A weldable pipe fitting as claimed in claim 8 wherein the sets of heating wire or wires are connected in series by means of helical wire continuations running, wide pitch, around the inner periphery of the sleeve across the stress resistant portion.

10. A weldable pipe fitting as claimed in claim 1 wherein the tapered portion is at an angle of 30°.

* * * * *

UNITED STATES PATENT AND TRADEMARK OFFICE
CERTIFICATE OF CORRECTION

PATENT NO. : 5,354,100
DATED : October 11, 1994
INVENTOR(S) : David L. Wall, Robert E. Beechey It is certified that error appears in the above-indentified patent and that said Letters Patent is hereby corrected as shown below:

Column 4, line 28, delete "well", insert --wall--.
Column 4, line 53, delete "the,", insert --the--.
Column 4, line 54, delete "tile", insert --the--.

Signed and Sealed this

Twenty-eight Day of March, 1995

Attest:

BRUCE LEHMAN

*Attesting Officer*            *Commissioner of Patents and Trademarks*